United States Patent
Sally et al.

(10) Patent No.: US 7,353,235 B2
(45) Date of Patent: Apr. 1, 2008

(54) CONTENT FILTERING, ORDERING BY RELEVANCE, AND CACHING

(75) Inventors: Kevin Lee Sally, Markham (CA); Julie Frances Waterhouse, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/921,444

(22) Filed: Aug. 19, 2004

(65) Prior Publication Data
US 2005/0097121 A1 May 5, 2005

(30) Foreign Application Priority Data
Oct. 29, 2003 (CA) ................... 2447434

(51) Int. Cl.
*G06F 17/00* (2006.01)
(52) U.S. Cl. .............. 707/102; 707/2; 707/6; 707/7; 707/200; 711/114
(58) Field of Classification Search .......... 707/1–10, 707/100–104.1, 200–206; 711/114, 145; 712/11–16; 715/700; 370/352, 392, 428, 370/514
See application file for complete search history.

(56) References Cited

U.S. PATENT DOCUMENTS

| | | | |
|---|---|---|---|
| 5,560,007 A | | 9/1996 | Thai |
| 5,649,181 A | * | 7/1997 | French et al. .......... 707/3 |
| 6,219,662 B1 | * | 4/2001 | Fuh et al. .......... 707/3 |
| 6,285,996 B1 | * | 9/2001 | Jou et al. .......... 707/4 |
| 6,510,458 B1 | | 1/2003 | Berstis et al. |
| 7,116,663 B2 | * | 10/2006 | Liao .......... 370/392 |
| 2002/0075321 A1 | | 6/2002 | Sakatani |
| 2002/0107853 A1 | | 8/2002 | Hofmann et al. |
| 2003/0108043 A1 | | 6/2003 | Liao |

OTHER PUBLICATIONS

Baluja, S et al., Local optimazation using simulated annealing, Oct. 18-21, 1992, vol. 1, 583-588.*
Ashim Gupta et al., Performance Comparison of Property Map and Bitmap Indexing, 2002, 65-71.*

* cited by examiner

*Primary Examiner*—Jean Bolte Fleurantin
(74) *Attorney, Agent, or Firm*—Jeanine Ray-Yarletts, Esq.; Steven M. Greenberg, Esq.; Carey Rodriguez Greenberg & Paul LLP (57) ABSTRACT

There is disclosed a technique for organizing a plurality of content items. In an embodiment, the technique comprises assigning to each content item a content item array or bit string, wherein each unique ordinal or bit position indicates a characteristic of the content item. The content items may be filtered by applying a content filter including at least one filter rule concerning at least one characteristic of each content item. In an embodiment, a user preference bit string is used to indicate a user preference for one or more characteristics of the content items. The user preference bit string may be compared to each content item bit string to determine relevance a content item, and to order the content items according to the user's preferences. In an embodiment, the content items may be cached using a cache key generated from the user preference bit string.

6 Claims, 9 Drawing Sheets

| Content Item ID | Subject Area Bit String (Bin) | User Preference Bit String (Bin) | Bitwise AND (Bin) | Relevance (Dec) |
|---|---|---|---|---|
| CID001 | 00001 | 00011 | 00001 | 1 |
| CID002 | 11000 | 00011 | 00000 | 0 |
| CID003 | 00011 | 00011 | 00011 | 2 |
| CID004 | 00101 | 00011 | 00001 | 1 |
| CID005 | 01000 | 00011 | 00000 | 0 |
| CID006 | 10101 | 00011 | 00001 | 1 |
| CID007 | 10000 | 00011 | 00000 | 0 |

CONTENT RANKING BY USER PREFERENCE ID (FOR UPID001)

SUBJECT AREA

| Subject ID | Subject Area | Unique Bit Position |
|---|---|---|
| SID001 | Hardware | 00001 |
| SID002 | Desktop Systems | 00010 |
| SID003 | Mobile Systems | 00100 |
| SID004 | Software | 01000 |
| SID005 | Internet | 10000 |

FIG. 6

CONTENT ITEMS

| Content Item ID | Content Item | Content Item Bit String |
|---|---|---|
| CID001 | New CPU Announcement | 00001 |
| CID002 | Internet Software News | 11000 |
| CID003 | Desktop Hardware News | 00011 |
| CID004 | Mobile Hardware News | 00101 |
| CID005 | Software News | 01000 |
| CID006 | Mobile Internet Hardware News | 10101 |
| CID007 | Internet News | 10000 |

FIG. 7

USER PREFERENCE

| User Preference ID | User Preference Bit String | Cache Key (Hex) |
|---|---|---|
| UPID001 | 00011 | 3 |
| UPID002 | 11000 | 18 |
| UPID003 | 00101 | 5 |

FIG. 8

CONTENT FILTERS

902A CONTENT FILTER FOR PORTLET 902B:
FILTER RULE = DISPLAY IF 00001 OR 00010 OR 00100

904A CONTENT FILTER FOR PORTLET 904B:
FILTER RULE = DISPLAY IF 01000

906A CONTENT FILTER FOR PORTLET 906B:
FILTER RULE = DISPLAY IF 10000

FIG. 9A

FILTERED CONTENT DISPLAY

Hardware News

- New CPU Announcement (CID001)
- Desktop Hardware News (CID003)
- Mobile Hardware News (CID004)
- Mobile Internet Hardware News (CID006)

902B

Software News

- Internet Software News (CID002)
- Software News (CID005)

904B

Internet News

- Internet Software News (CID002)
- Mobile Internet Hardware News (CID006)
- Internet News (CID007)

| Content Item ID | Subject Area Bit String (Bin) | User Preference Bit String (Bin) | Bitwise AND (Bin) | Relevance (Dec) |
|---|---|---|---|---|
| CID001 | 00001 | 00011 | 00001 | 1 |
| CID002 | 11000 | 00011 | 00000 | 0 |
| CID003 | 00011 | 00011 | 00011 | 2 |
| CID004 | 00101 | 00011 | 00001 | 1 |
| CID005 | 01000 | 00011 | 00000 | 0 |
| CID006 | 10101 | 00011 | 00001 | 1 |
| CID007 | 10000 | 00011 | 00000 | 0 |

CONTENT RANKING BY USER PREFERENCE ID (FOR UPID001)

FIG. 10

Hardware News

- Desktop Hardware News (CID003)
- New CPU Announcement (CID001)
- Mobile Hardware News (CID004)
- Mobile Internet Hardware News (CID006)

Internet News

- Mobile Internet Hardware News (CID006)
- Internet Software News (CID002)
- Internet News (CID007)

Software News

- Internet Software News (CID002)
- Software News (CID005)

CONTENT RANKED BY RELEVANCE (FOR UPID001)

CONTENT FILTERING, ORDERING BY RELEVANCE, AND CACHING

BACKGROUND OF THE INVENTION

The present invention relates generally to data processing systems, and more specifically to a technique for organizing content items.

In certain situations, it may be desirable to filter, order by relevance, and/or cache content items for delivery to a user. As an illustrative example, consider the world wide network of computers commonly known as the Internet. A hypertext information and communication system known as the World Wide Web ("WWW") operates on the Internet, according to a client-server model using HyperText Transfer Protocol ("HTTP"), to make content on a web site on the WWW accessible to users. The accessible content on the web site may be of many different types including text, graphics, images, sound, and video.

In a given situation, a web developer/administrator may wish to organize some of the content items available on a web site. This organization may involve, for example, filtering some of the content items for display. In another situation, the web developer/administrator may wish to organize the content items to reflect a particular user's preferences. In yet another situation, the web developer/administrator may wish to cache frequently accessed content items. Known techniques for organizing content items in this manner typically require complex database queries, possibly involving multiple table joins in each case. As will be appreciated, such complex database queries may be costly in terms of data processing resources consumed, possibly limiting the flexibility of a web developer/administrator in organizing the content items as desired. Thus, a more efficient technique for organizing content items is needed.

SUMMARY OF THE INVENTION

There is provided a method, system and computer readable medium for organizing content items. The organizing may include filtering, ordering by relevance, and/or caching.

In an embodiment, "characteristics" of a "content item" may be defined, with each characteristic being assigned an ordinal in an array (e.g. a "bit position" in a "bit string") sufficiently long to accommodate the characteristics. For example, the characteristics for a news article content item may be a list of related "subject areas".

A "content filter" may be assembled to filter the characteristics of a content item by filtering the content item's "content item bit string". A content filter comprises at least one filter rule concerning one or more unique bit positions in a content item bit string. A more complex content filter may be assembled from a plurality of filter rules using one or more logical operators (e.g. AND, OR, XOR, NAND, etc.).

The content filter may be compared to a content item bit string to determine whether there are any matching characteristics. In an embodiment, if at least one characteristic matches, then the content item may pass through the content filter and be displayed. In accordance with the teachings of the present invention, each filter rule in the content filter and may be compared to each content item bit string simply by performing a bitwise AND operation.

"User preferences" may be stored in a "user preference bit string", with each bit position in the user preference bit string corresponding to a characteristic, such as "subject area". In an embodiment, a user preference bit string applies to all users having the same characteristic preferences. Each user preference bit string may be converted to a cache key value for identifying a cache of content items. As an example, a hexadecimal equivalent of the user preference bit string may be used as a cache key.

A content item bit string and a user preference bit string may be compared to determine whether there are any matching characteristics between the content item and a user's preferences. In accordance with the teachings of the present invention, the content item bit string and user preference bit string may be compared simply by performing a bitwise AND operation.

The number of matching characteristics in a comparison between the user preference bit string and the content item bit string may be used to calculate a "relevance value" for each content item. The calculated relevance value may be used to order the content items for delivery according to the user's preferences.

In an aspect of the invention, there is provided a method of organizing a plurality of content items, comprising:
(i) assigning to each content item a content item array, wherein each ordinal of the content item array indicates a characteristic of the content item;
(ii) applying a content filter to the plurality of content items, the content filter including at least one filter rule concerning at least one characteristic of each content item.

In an embodiment, the array comprises a bit string, and the ordinal comprises a unique bit position in the bit string.

In an embodiment, the method further comprises associating a display area with the content filter, and facilitating display in the display area of any content items that pass through the content filter.

In an embodiment, the content filter is assembled from at least one filter rule, and multiple filter rules, if present, are combined by a logical operator.

In an embodiment, applying a content filter in (ii) comprises performing a bitwise AND operation between each filter rule of the content filter and each content item bit string.

In an embodiment, the method further comprises, before (i), defining each possible characteristic of a content item, and assigning to each possible characteristic a unique bit position.

In an embodiment, the characteristic comprises whether or not a defined subject area relates to the content item, and the content item bit string indicates, at each unique bit position, such a characteristic.

In an embodiment, the method further comprises:
(iii) assigning to each user of the plurality of content items a user preference bit string, wherein each unique bit position in the user preference bit string indicates whether the user has a preference for a corresponding characteristic of the content items;
(iv) comparing the user preference bit string to each content item bit string to determine if any characteristics match.

In an embodiment, the method in (iv) comprises performing a bitwise AND operation between each content item bit string and the user preference bit string.

In an embodiment, the method further comprises:
(v) calculating for each content item a relevance value in dependence upon the comparing in (iv);
(vi) ordering the content items based, at least in part, on the relevance values calculated in (v).

In an embodiment, the relevance value is calculated by counting the number of matching characteristics in the results of the bitwise AND operation in (iv).

In an embodiment, the method further comprises facilitating display in a display area the content items ordered in (vi).

In an embodiment, the method further comprises:

(vii) caching the content items ordered in (vi) utilizing a cache key generated from the user preference bit string.

In another aspect of the invention, there is provided a system comprising a processor and computer readable memory, the memory storing code for organizing a plurality of content items, the code being configured to:

(a) assign to each content item a content item array, wherein each ordinal of the content item array indicates a characteristic of the content item;

(b) apply a content filter to the plurality of content items, the content filter including at least one filter rule concerning at least one characteristic of each content item.

In an embodiment, the array comprises a bit string, and the ordinal comprises a unique bit position in the bit string.

In another aspect of the invention, there is provided a computer readable medium containing computer executable code for organizing a plurality of content items, the computer executable code comprising:

(a) code for assigning to each content item a content item array, wherein each ordinal of the content item array indicates a characteristic of the content item;

(b) code for applying a content filter to the plurality of content items, the content filter including at least one filter rule concerning at least one characteristic of each content item.

In an embodiment, the array comprises a bit string, and the ordinal comprises a unique bit position in the bit string.

The foregoing and other aspects of the invention will be apparent from the following more particular descriptions of exemplary embodiments of the invention.

BRIEF DESCRIPTION OF THE DRAWINGS

In the figures which illustrate exemplary embodiments of the invention.

DETAILED DESCRIPTION OF EXEMPLARY EMBODIMENTS

Figure 1:
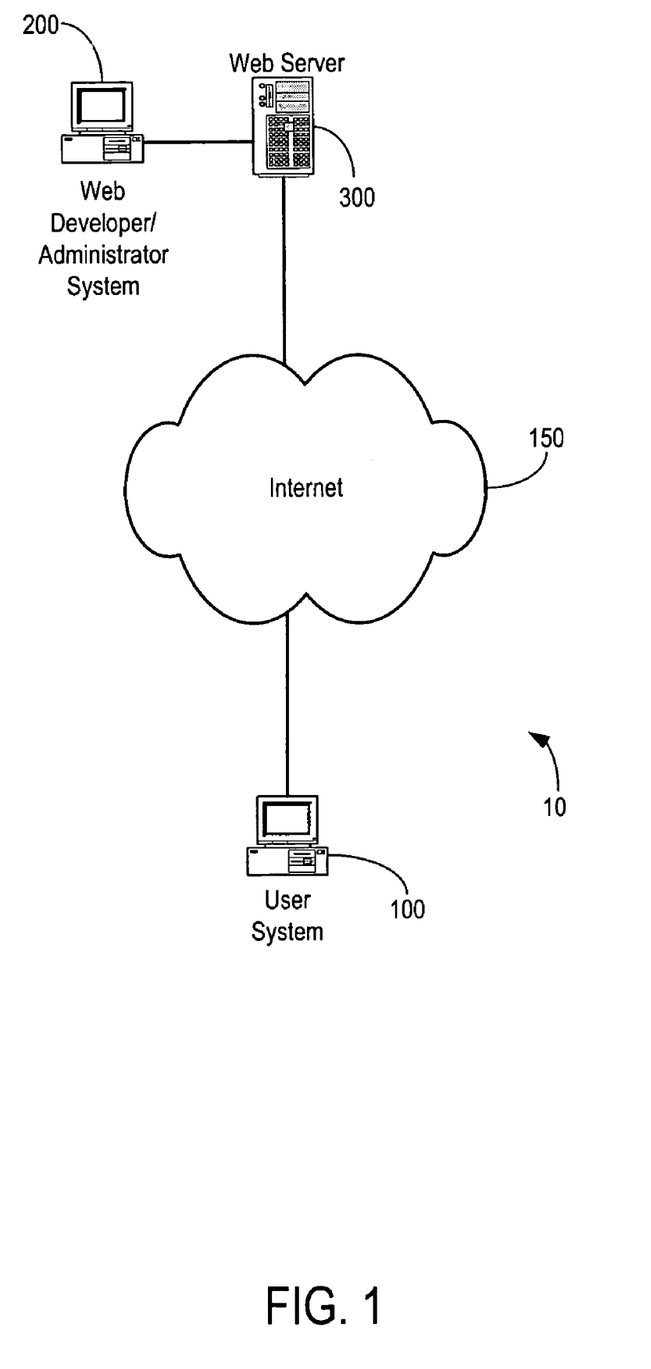
FIG. 1 is a schematic block diagram of a computer network which may provide an operating environment for exemplary embodiments of the invention.

FIG. 1 shows an illustrative computer network 10 which may provide an operating environment for exemplary embodiments of the invention. A user system 100 is connected to the Internet 150. A web server 300 is also connected to the Internet 150 and may be accessed by the user system 100 in known manner. A web developer/administrator system 200 is connected to the web server 300 to develop and administer web content for the web server 300. It will be appreciated that the computer network 10 of FIG. 1 is merely illustrative and is not meant to be limiting in terms of the type of operating environment suitable for practicing various embodiments of the invention.

Figure 2:
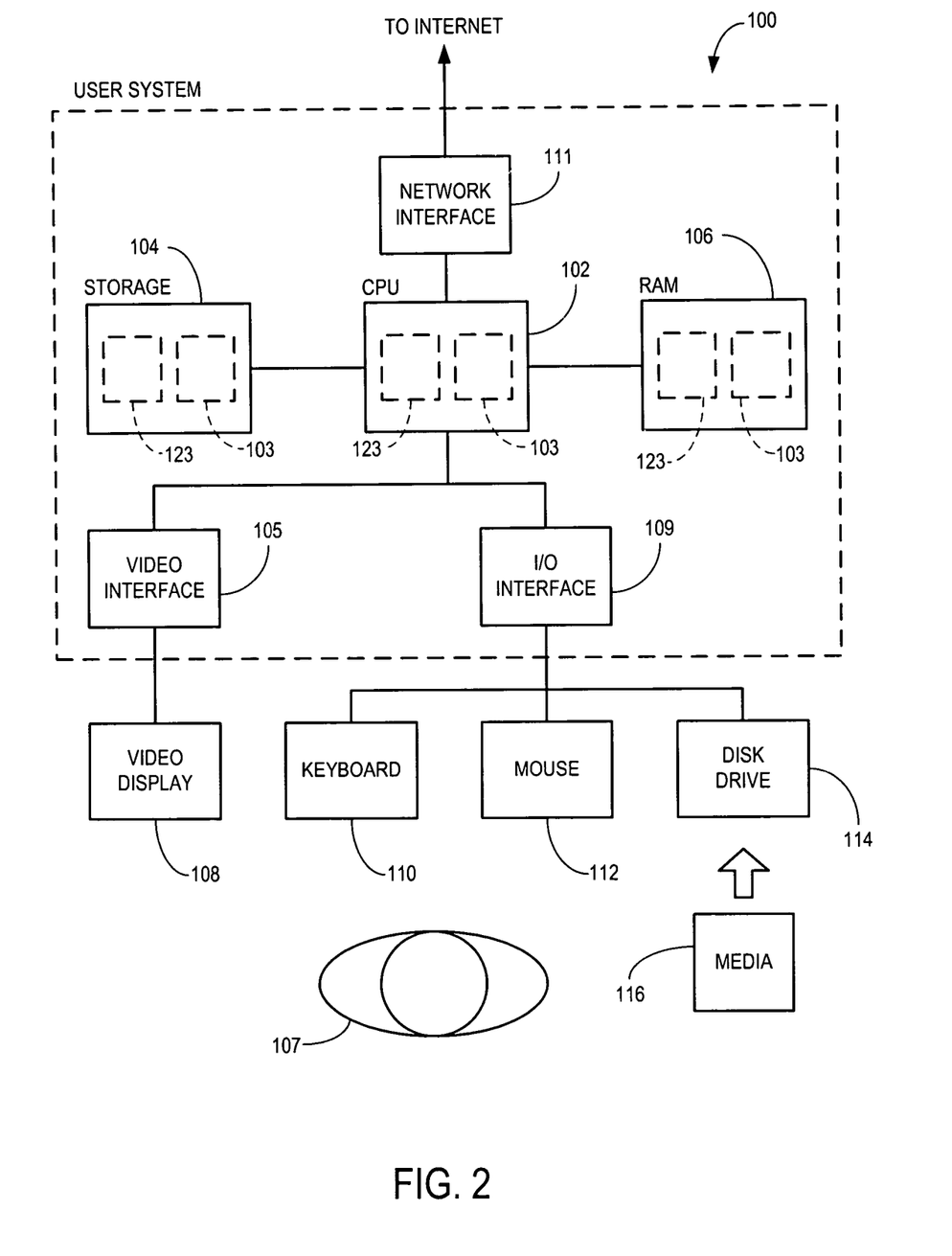
FIG. 2 is schematic block diagram of an illustrative user system which may be found in the computer network of FIG. 1.

Now referring to FIG. 2, shown in detail is a possible user system 100 which may be found in FIG. 1. As shown, the user system 100 may include a central processing unit ("CPU") 102 connected to a storage unit 104 and to a random access memory ("RAM") 106. The CPU 102 may run an operating system 103 and execute one or more application programs 123. In the present illustrative example, application program 123 may be a web browser application program. The operating system 103 and application program 123 may be stored in storage unit 104 and loaded into RAM 106 as required. A user 107 may interact with the user system 100 using a video display 108 connected by a video interface 105, and various input/output ("I/O") devices such as a keyboard 110, mouse 112 and disk drive 114 connected by an I/O interface 109. The disk drive 114 may be configured to accept computer readable media 116. The user system 100 is network enabled via a network interface 111. As shown, network interface 111 allows the user system 100 to access the Internet 150.

Figure 3:
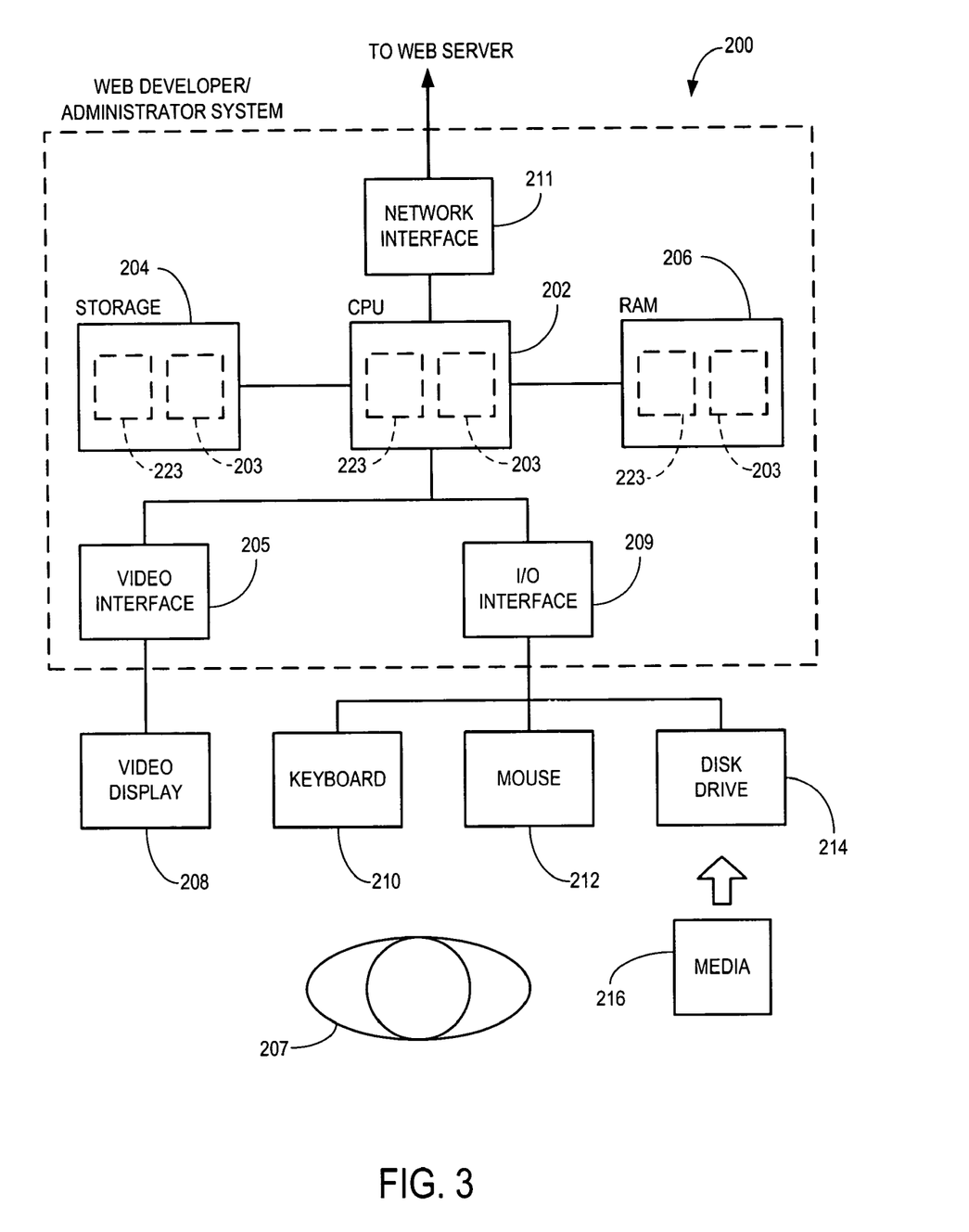
FIG. 3 is a schematic block diagram of an illustrative web developer/administrator system which may be found in the computer network of FIG. 1.

Now referring to FIG. 3, shown in detail is a possible web developer/administrator system 200 which may be found in the computer network of FIG. 1. As will be apparent, the web developer/administrator system 200 may be substantially similar to the user system 100 of FIG. 2, with a CPU 202, storage 204, and RAM 206 to run an operating system 203 and an application program 223. The application program 223 may be, for example, a web development/administration program 223. The web development/administration program 223 may be configured to perform various tasks, as described in detail further below. A web developer/administrator 207 may interact with the web developer/administrator system 200 using a video display 208 connected by a video interface 205, and various I/O devices 210, 212, 214 connected by an I/O interface 209. The disk drive 214 may be configured to accept computer readable media 216. The web developer/administrator system 200 is network enabled via a network interface 211.

Figure 4:
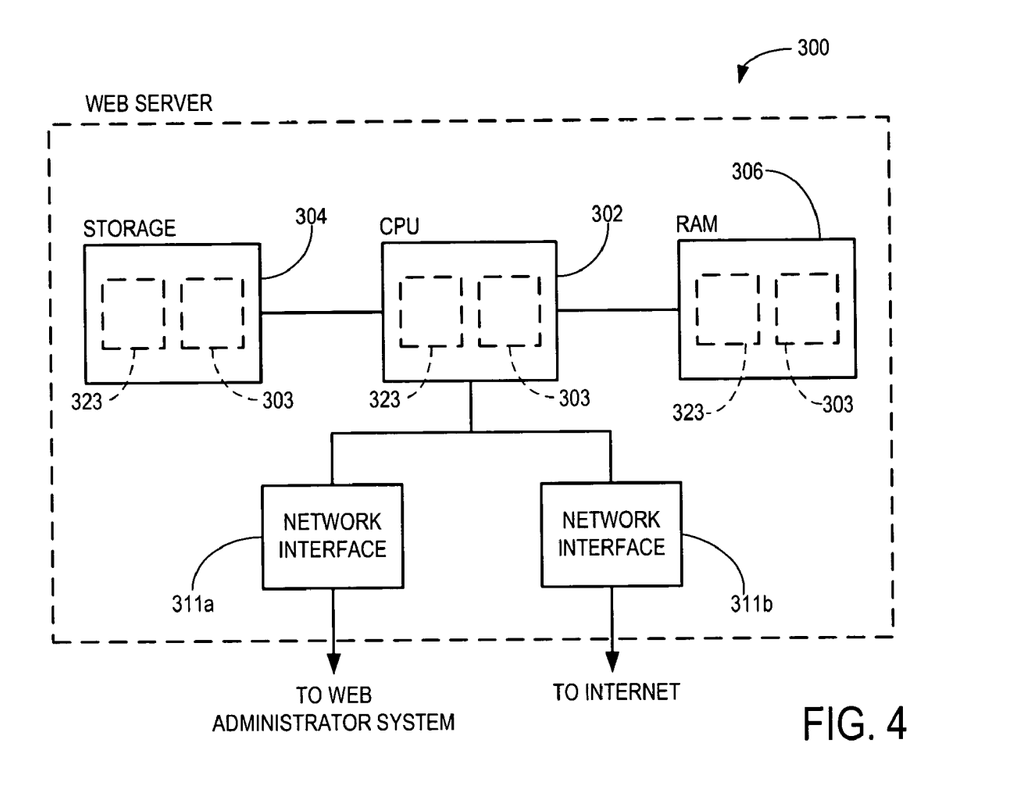
FIG. 4 is a schematic block diagram of an illustrative web server which may be found in the computer network of FIG. 1.

Now referring to FIG. 4, shown in detail is a possible web server 300 which may be found in FIG. 1. As shown, the web server 300 has CPU 302, storage 304, and RAM 306 to run an operating system 303 and one or more application programs 323. For example, one application program may be a web server application program 323 allowing content stored on the web server 300 to be accessed by a user (e.g. user 107 of FIG. 2). In an embodiment, web server 300 may be connected to the web developer/administrator system 200 via a first network interface 311a. The web server 300 may also be connected to the Internet 150 via a second network interface 311b.

It will be appreciated that each of the user system 100, the web developer/administrator system 200, and web server 300 described above are merely illustrative, and not meant to be limiting in terms of the type of systems that may provide a suitable operating environment for practicing various embodiments of the invention.

Figure 5:
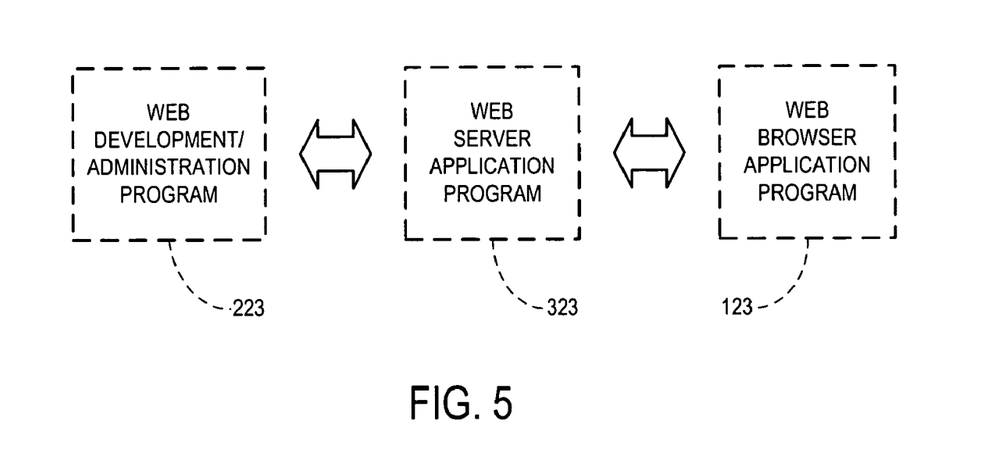
FIG. 5 is a schematic block diagram showing interaction between applications running on the user system, the web developer/administrator system and the web server of FIGS. 2-4.

Now referring to FIG. 5, a block diagram schematically shows interaction between various applications running on the user system 100, the web developer/administrator system 200, and the web server 300. More specifically, the web development/administration program 223 running on the web developer/administrator system 200 interacts with the web server application program 323 running on the web server 300 to develop and administer web content for the web server 300. The web browser application program 123 running on the user system 100 interacts with the web server application program 323 to access web content items on the web server 300 for user 107.

Figure 6:
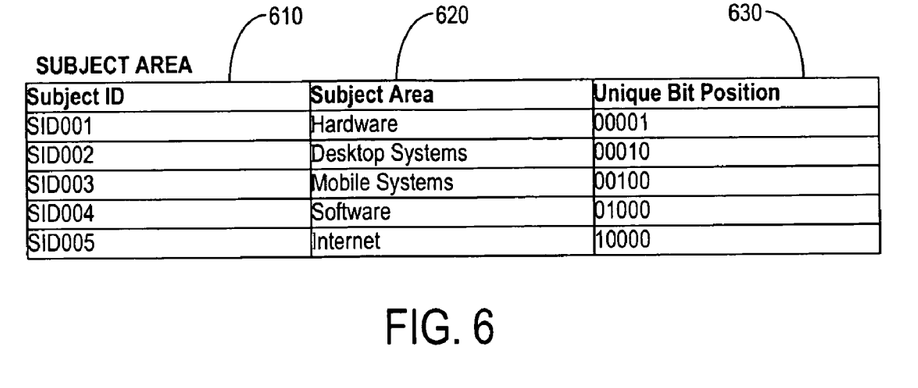
FIG. 6 is a schematic representation of an illustrative listing of defined characteristics, such as related subject areas, with each subject area being associated with a unique bit position in a bit string.

Now referring to FIG. 6, shown is an illustrative example of a list of defined characteristics for a list of content items (e.g. web content items available on the web server 200). In this illustrative embodiment, the characteristics may be subject areas related to content items. These subject areas may be defined, for example, by the web developer/administrator 207 using the web development/administration application program 223 on the web developer/administrator system 200 of FIG. 3. The list of characteristics or subject areas may then be stored on web server 300 together with the content items.

As an illustrative example, in column 610, five subject IDs "SID001" to "SID005" are listed. These subject IDs in column 610 correspond to the illustrative subject areas defined in column 620. In this illustrative example, the five subject areas are, respectively, "Hardware", "Desktop Systems", "Mobile Systems", "Software", and "Internet".

As shown in column 630, each of these subject areas described in column 620 is assigned an ordinal represented by a unique bit position, within a bit array or bit string. (In the present discussion, the term "bit array" simply denotes a logical array of related bits, such as a bit string.) For example, SID001 (hardware) is assigned the right most bit position (00001); SID002 (desktop systems) is assigned the second bit position from the (right) 00010, and so on.

While five subject areas are shown here for the purposes of illustration, it will be appreciated that virtually any number of subject areas may be assigned a unique bit position in the manner described, the only practical limitation being the capabilities of the application programs and hardware that must process the bit string. In prototype systems built by the inventors, 256-bit long bit string have been used with no difficulty. It is envisioned that much longer bit strings may be used, subject to the limitations described.

Figure 7:
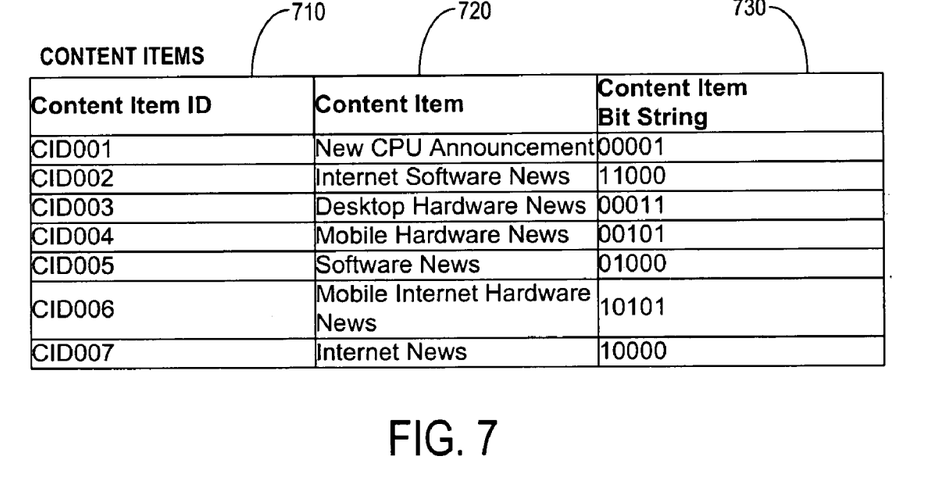
FIG. 7 is a schematic representation of an illustrative list of content items, each content item being associated with a bit string indicating to which subject area(s) the content item relates.

Now referring to FIG. 7, shown is an illustrative example of a list of content items. As described above, these content items may be developed/administered by a web developer/administrator 207 using the web development/administration application program 223 on the web developer/administrator system 200 of FIG. 3, and stored on the web server 300 of FIG. 3.

As shown, column 710 includes seven content items "CID001" to "CID007". Column 720 contains the corresponding descriptions or titles for the content items in column 710. For example, CID001 has the description or title "New CPU Announcement", CID002 has the description or title "Internet Software News", and so on.

As shown in column 730, CID001 ("New CPU Announcement") is assigned a content item bit string of 00001. Here, the bit position of the "1" indicates that CID001 is related to subject matter SID001 (i.e. "Hardware", as defined in the list of subject areas in FIG. 6 is a characteristic of CID001). Similarly, CID002 (Internet Software News) is assigned a content item bit string of 11000, indicating that CID002 is related to both SID004 and SID005 (i.e. "Software" and "Internet", as defined in the list of subject areas in FIG. 6) are characteristics of CID002. As shown, the remainder of the content items, CID003 to CID007, are similarly assigned content item bit strings indicating the subject area(s) to which each content item relates.

Figure 8:
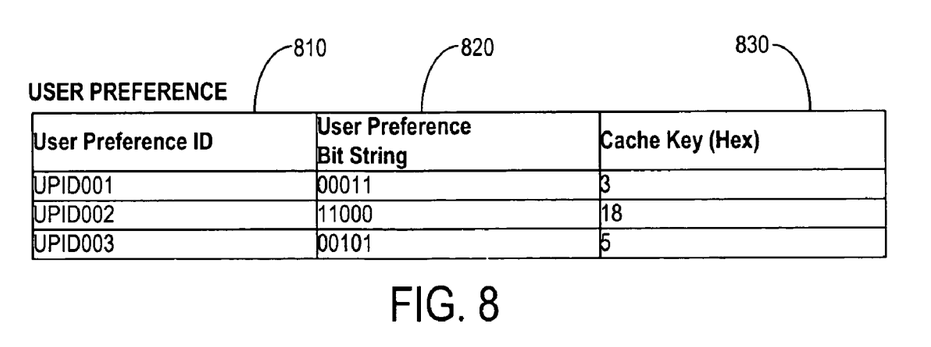
FIG. 8 is a schematic representation of an illustrative list of defined user preference identities ("IDs"), each user preference ID being defined by a user preference bit string indicating subject areas are of interest.

Now referring to FIG. 8, shown is an illustrative example of a list of user preferences for subject areas. In an embodiment, one a user preference ID corresponds to a preselection of preferences by a user (such as user 107 of FIG. 2) to indicate which subject areas are of interest to the user.

As shown, column 810 defines user preference IDs "UPID001" to "UPID003", where each user preference ID may apply to users having the same subject area preferences. A "user preference ID" may apply to a single user, if that single user is the only user with those user preferences.

As shown, column 820 includes a corresponding list of user preference bit strings associated with each user preference ID. For example, UPID001 is associated with a user preference bit string of 00011. This indicates that a user with UPID001 has expressed an interest in SID001 ("Hardware") and SID002 ("Desktop systems") as previously defined in FIG. 6. The other user preference IDs are also associated with respective user preference bit strings, as shown, indicating the subject area preferences for various users.

Still referring to FIG. 8, column 830 shows a "hexadecimal" representation of the user preference bit strings in column 820. In an embodiment, these hexadecimal representations of the user preference bit strings in column 820 may be used as cache keys for caching content items (e.g. in the web server 300 of FIG. 4) if advantageous to do so. For example, if a large number of users have the same user preferences (i.e. the users share the same interest areas as described above), it may be advantageous to cache filtered and ordered content items for such users, so as to allow repeated and frequent access. This may avoid the data processing cost of filtering and ordering content items with each access, and may provide users with faster access times. However, the data processing cost of filtering and ordering the content with each access should be compared to the cost of caching the content to determine if there is an overall benefit to caching. It will be appreciated that caching will be most advantageous where a large number of users have the same user preferences, and access to the cached items is very frequent. As the number of subject areas increases, and the likelihood of a large number of users having the same preferences is reduced, caching may not be suitable.

Figure 9A:
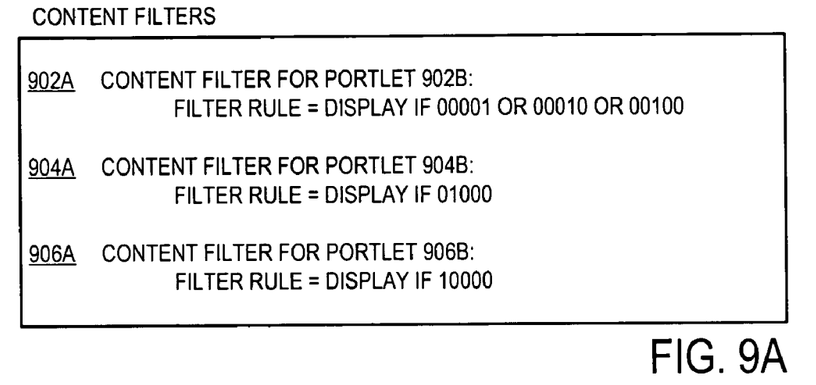
FIG. 9A is an illustrative example of defined content filters.
Figure 9B:
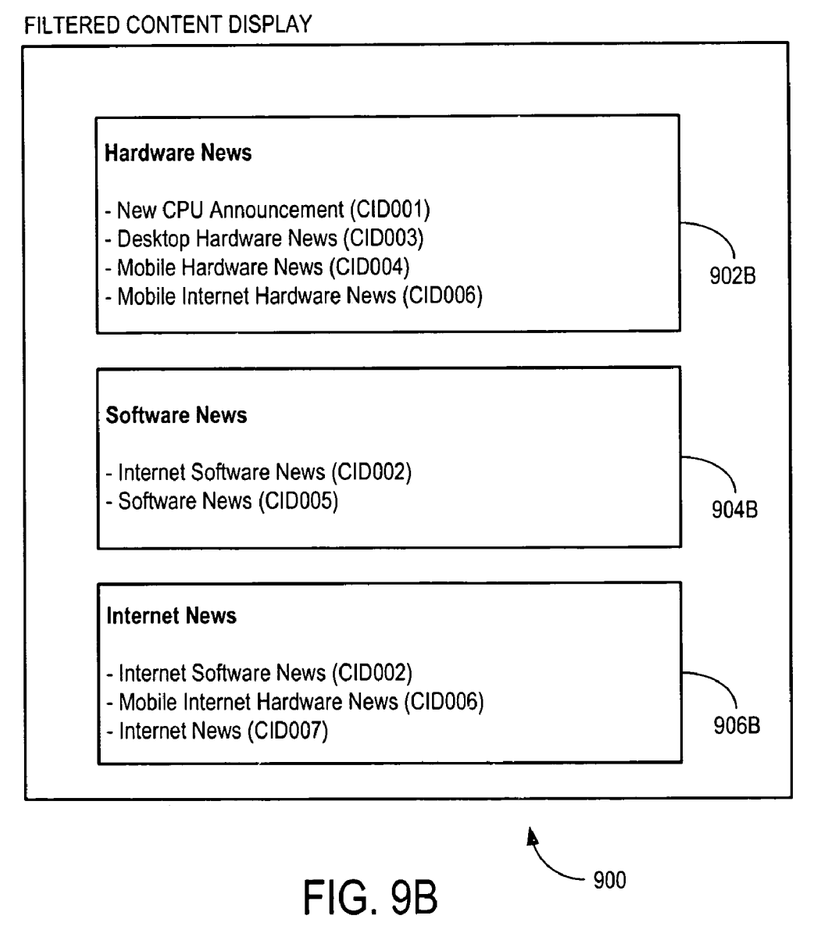
FIG. 9B is a schematic representation of an illustrative display of content items filtered according to the content filters defined in FIG. 9A.

Now referring to FIGS. 9A and 9B, shown is an illustrative example of defined content filters 902A, 904A, and 906A for displaying content items in corresponding display areas or portlets 902B, 904B and 906B of a display 900. Display 900 may appear, for example, on video display 108 of the user system 100 of FIG. 2. In this illustrative example, portlet 902B is labeled "Hardware News", portlet 904B is labeled "Software News", and portlet 906B is labeled "Internet News".

As shown in FIG. 9A, content filter 902A is assembled from three filter rules which are OR'ed together: a first filter rule that passes content items with a value of "1" in the first bit position from the right in their respective content item bit strings; a second filter rule that passes content items with a value of "1" in the second bit position from the right in their respective content item bit strings; and a third filter rule that passes content items with a value of "1" in the third bit position from the right in their respective content item bit strings. In an embodiment, each of these filter rules, in turn, may be compared against a content item bit string by using a bitwise AND operation. (In the present context, a bitwise AND operation provides a result of "1" in a bit position only if there is a "1" in the same bit position in both of the bit strings being compared.) Content items passing content filter 902A are displayed in portlet 902B in display 900.

Similarly, content filter 904A includes a single filter rule that passes content items with a value of "1" in the fourth bit position from the right, in their respective content item bit strings. Again, the filter rule may be compared against a content item by using a bitwise AND operation. Content items passing content filter 904A are displayed in corresponding portlet 904B in display 900.

Finally, content filter 906A includes a filter rule that passes content items with a value of "1" in the fifth bit position from the right, in their respective content item bit strings. Again, the filter rule may be compared against a content item by using a bitwise AND operation. Content items passing content filter 906A are displayed in corresponding portlet 906B in display 900.

It will be seen from FIG. 9B that the content items of FIG. 7 have been filtered according to the various filter rules in the content filters 902A, 904A, 906A, for display in corresponding portlets 902B, 904B, 906B. It will also be apparent from the above illustrative examples that more complex content filters may be readily assembled by combining one or more such filter rules using logical operators such as AND, OR, and so on. In prototype testing, the inventors have found that filtering content items by application of one or more such filter rules, in accordance with the teachings of the present invention, is a more efficient technique for filtering content items in comparison to earlier known techniques which use complex database queries.

Figure 10:
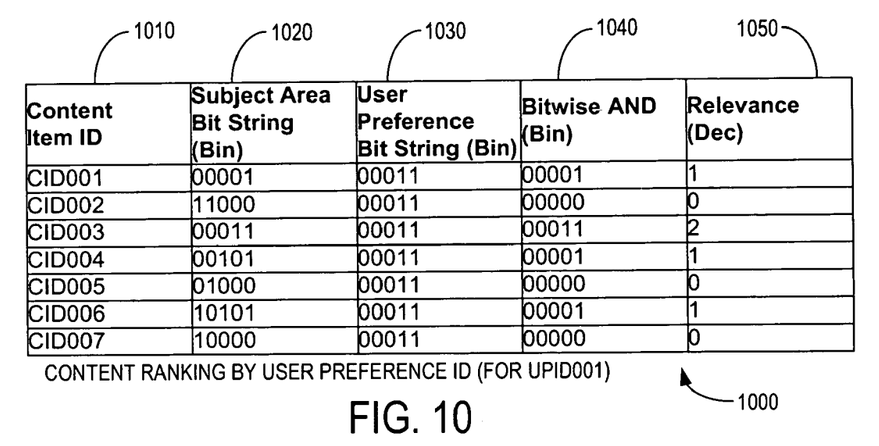
FIG. 10 is a schematic representation of a comparison between a user preference bit string and a content item bit string.

Now referring to FIG. 10, shown in table 1000 is an illustrative example of how the content items of FIG. 7 may be organized according to a user's preferences. This organization may be performed, for example, on the web server 300 of FIG. 4 under control of the web developer/administrator 207.

As shown, column 1010 lists the same content items as previously defined in FIG. 7. Column 1020 lists the content item bit strings associated with each of the content item IDs previously defined in FIG. 7. Column 1030 lists user preferences for a particular user preference ID (UPID001 in this illustrative example). For UPID001, the user preferences are defined by the bit string 00011. Column 1040 shows the results of a bitwise AND operation (as defined above) between the bit strings in columns 1020 and 1030. As shown, this bitwise AND operation provides a result of "1" in a bit position only if there is a "1" in the same bit position in both the content item bit string in column 1020 and user preference bit string in column 1030. The results of the bitwise AND operation for this illustrative example are shown in column 1040.

As shown in column 1050, content item IDs 1 through 7 have a "relevance value" of 1, 0, 2, 1, 0, 1, and 0, respectively. As will be apparent, each relevance value is simply a count of the "1" values in the results of the bitwise AND operation in column 1040. In an embodiment, these relevance values in column 1050 may be used to order the content items for display. For example, CID003 ("Desktop Hardware News") has the highest relevance value of 2 and, therefore, is deemed to be of particular interest to users with UPID001.

In an embodiment, a sorting algorithm may sort the content items according to "relevance values" (e.g. 1-match list, 2-match list, 3-match list, etc.). These lists may be concatenated (best-match, second-best match, third-best match. etc.) to order the content items for display.

As shown in FIG. 11, there are again three display areas or portlets 1102, 1104, and 1106. As content item CID003 has the highest relevance value for UPID001, as calculated above, CID003 may now be displayed as the first item in portlet 1102 in FIG. 11. Other content items with lower relevance values may then follow. In an embodiment, content items in the same portlet having the same relevance value may be ordered according to some other characteristic. For example, content items with the same relevance value may be ordered by content item ID, alphabetically, by posting date and time of the content item, and so on.

Figure 11:
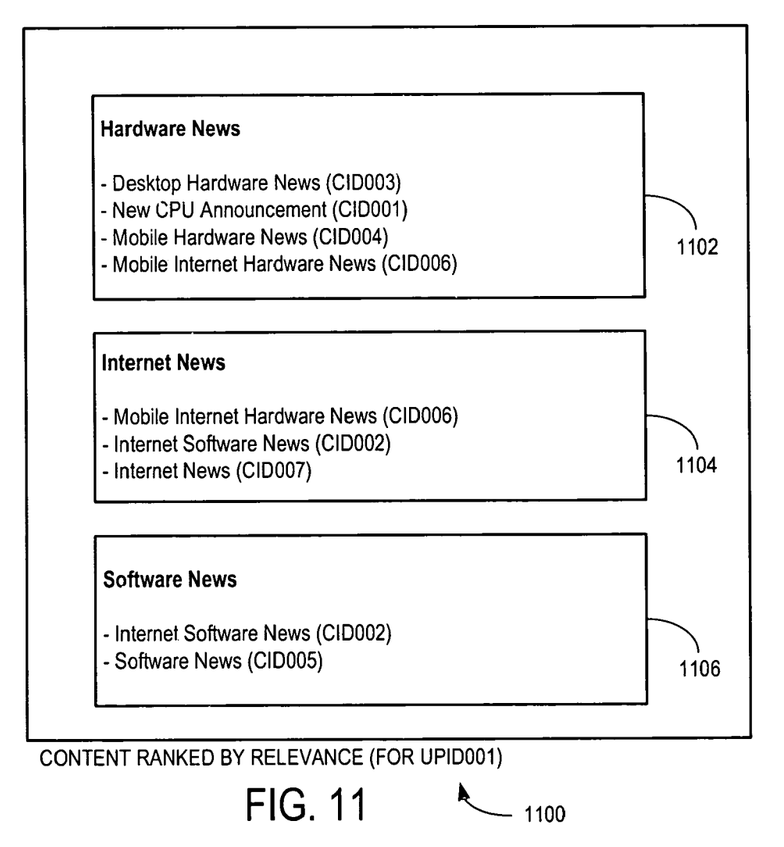
FIG. 11 is a schematic representation of an illustrative display of content items reordered based on results of the comparison in FIG. 10.

Although not shown in this illustrative example, in an embodiment, content items having a relevance of "0" may be excluded from display.

In the illustrative example shown in FIG. 11, it will be apparent that the two display areas "Internet News" and "Software News" have changed order. This changed ordering may be based, for example, on the relevance value calculations described above, and the number of content items which are deemed to be of relevance for a user preference ID (UPID001 in this illustrative example). It will be readily apparent to those skilled in the art that this is only one of many possible ways in which the content items may be filtered and ordered, using the content item bit strings and user preference bit strings as described above. Furthermore, it will be appreciated that these bit string representations of the content item subject areas and user preferences make the calculation of relevance very straightforward, as described above.

Figure 12:
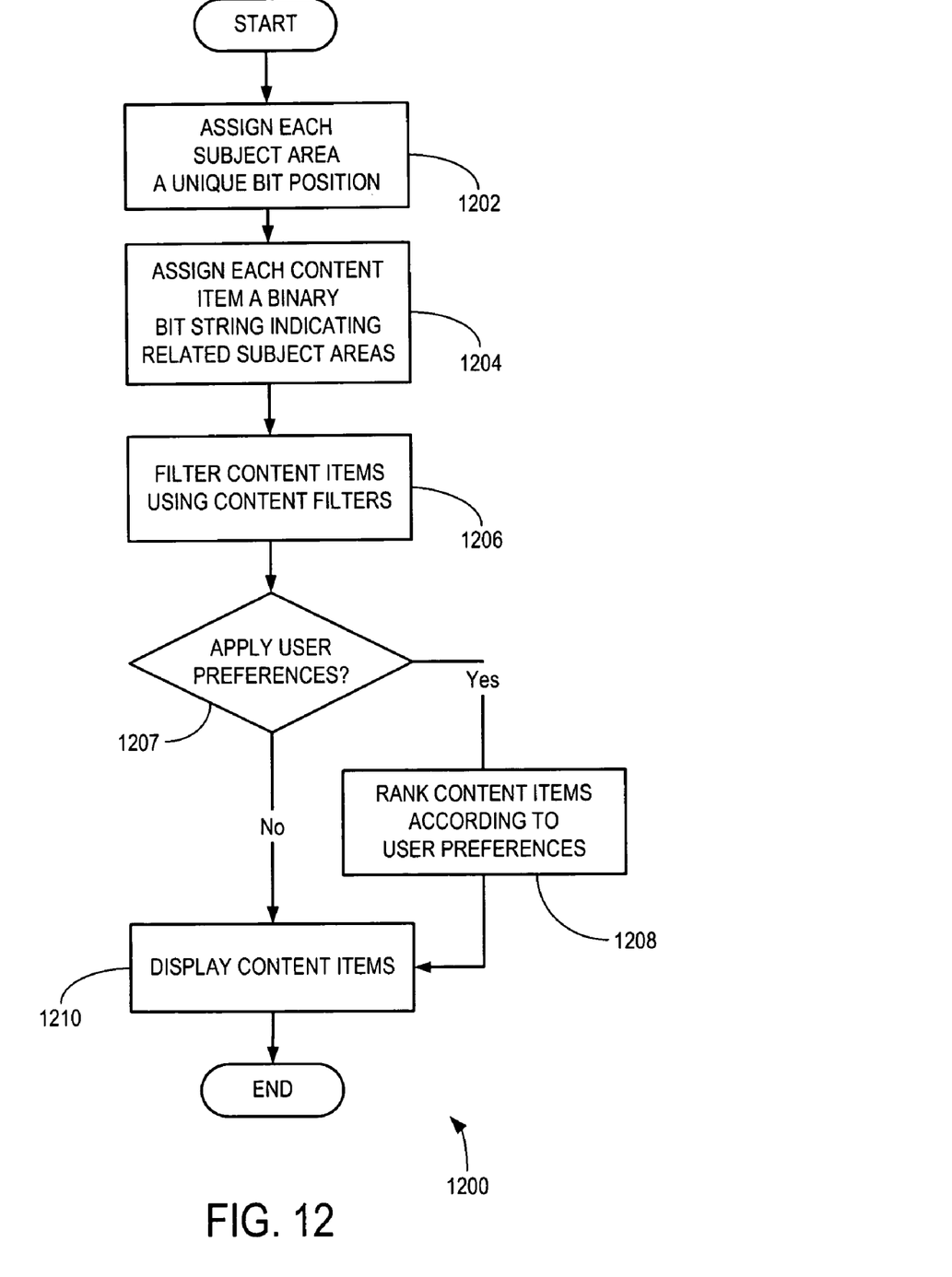
FIG. 12 is a schematic flow chart of a method in accordance with an embodiment of the invention.

Now referring to FIG. 12, shown is a simple schematic flow chart of a method 1200 in accordance with an embodiment of the invention. Method 1200 starts and proceeds to block 1202 where a list of possible subject areas are defined, and each subject area is assigned a unique bit position in a bit string (as shown by example in FIG. 6). Method 1200 then proceeds to block 1204 where a list of content items are assigned a content item bit string indicating the subject areas to which the content item relates (as shown by example in FIG. 7). Method 1200 then proceeds to block 1206 where a web developer/administrator may apply one or more filter rules to filter content items to be delivered to a user (as shown by example in FIG. 9A). Method 1200 then proceeds to decision block 1207 where method 1200 determines whether the filtered content items should be ordered by user preference. If no, method 1200 proceeds to block 1210 where the content items may be displayed according to the content filters for each display area (as shown by way of example in FIG. 9B). Method 1200 then ends. If yes, method 1200 proceeds to block 1208.

At block 1208, method 1200 performs a calculation to obtain a relevance value for each content item for a selected user preference bit string (as shown by example in FIG. 10). Method 1200 then proceeds to block 1210 where the relevance values calculated at block 1208 may be used to order the content items for display to a user (as shown by example in FIG. 11). Method 1200 then ends.

Figure 13:
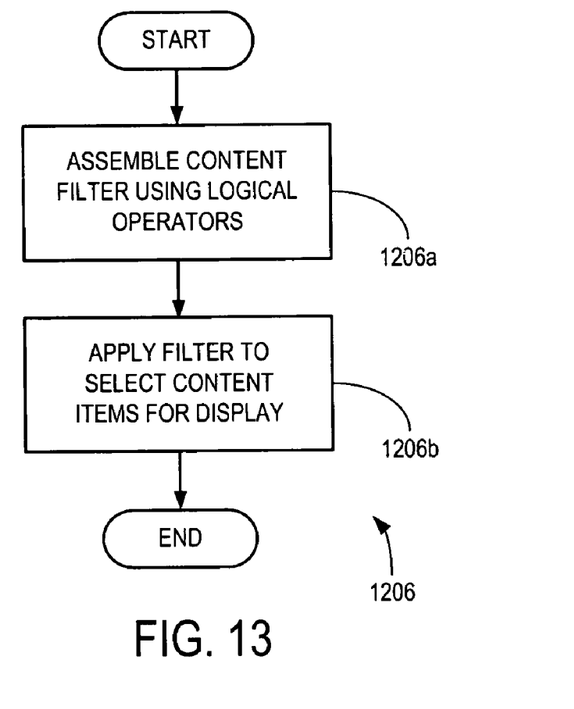
FIG. 13 is a schematic flow chart of a detail in the method of FIG. 12.

Now referring to FIG. 13, block 1206 of FIG. 12 is shown in more detail. As shown, method 1206 starts and proceeds to block 1206*a* where a content filter is assembled by a web developer/administrator using one or more filter rules (as shown by example in FIG. 9A). As noted earlier, more complex content filters may be assembled using a plurality of filter rules and appropriate logical operators. Method 1206 then proceeds to block 1206*b* where the content filter(s) is/are applied to filter content items (as previously described with reference to the example in FIGS. 9A and 9B). Method 1206 then ends.

Figure 14:
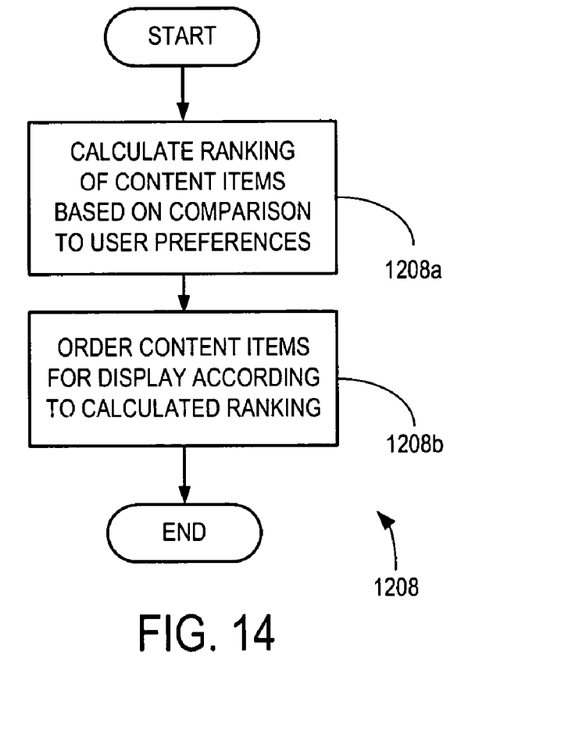
FIG. 14 is a schematic flow chart of another detail in the method of FIG. 12.

Now referring to FIG. 14, block 1208 of FIG. 12 is shown in greater detail. More specifically, method 1208 starts and proceeds to block 1208*a* where relevance values are calculated for each content item in accordance with a user's preferences (as shown by way of example in FIG. 10). Method 1208 then proceeds to block 1208*b* where the content items are ordered for display according to the rankings calculated in block 1208*a* (as shown by way of example in FIG. 11).

Although various exemplary embodiments of the invention have been described above, it will be appreciated that variations and modifications may be made.

For example, method 1200 (FIG. 12) describes filtering content items using content filters, then ordering the filtered content items by relevance to user preferences. However it will be apparent that the ordering of content items by relevance to user preferences may be done first, such that the content filters are applied to content items which have already been ordered by relevance to a user. However, given a large number of content items from which only a few content items will be displayed and ordered according to various user preferences, this may not be a preferred alternative.

As another example, while the illustrative embodiments presented above discusses a web based application, it will be appreciated that the teachings of the present invention may be applied to any type of database system, distributed over a network or centralized, in which a number of users need to access organized content items.

Also, while the content items in the above illustrative example relate to news articles, it will be appreciated that virtually any type of content including text, graphics, images, sound and video may be similarly filtered and ordered according to user preferences.

Furthermore, while a single bit array or bit string has been described in the above example, it will be appreciated that longer bit strings may be assembled from smaller bit string segments or "chunks". Thus, for example, it is possible to use a single bit string of 1024 bits, or an equivalent four bit strings of 256 bits, to define 1024 unique bit positions for 1024 characteristics. In this example, it will be appreciated that four bit string segments or chunks may be associated with each content item or user preference, and processed accordingly.

Also, it will be readily apparent to those skilled in the art that the values of "1" and "0" may be readily interchanged as a means of indicating whether or not a content item relates to a subject area or whether or not a user has a preference for a subject area.

Therefore, the scope of the invention is defined by the following claims.

What is claimed is:

1. A method of organizing a plurality of content items in a computer system, comprising:
   (i) assigning to each content item a content item array, wherein each ordinal of said content item array indicates a characteristic of said content item;
   (ii) applying a content filter to said plurality of content items, said content filter including at least one filter rule concerning at least one characteristic of each said content item, wherein said array comprises a content item bit string, and said each ordinal comprises a unique bit position in said content item bit string;
   (iii) assigning to each user of said plurality of content items a user preference bit string, wherein each unique bit position in said user preference bit string indicates whether said user has a preference for a characteristic represented by said unique bit position;
   (iv) comparing said user preference bit string to each said content item bit string to determine if any characteristics match, wherein said comparing in (iv) comprises performing a bitwise AND operation between each said content item bit string and said user preference bit string;
   (v) calculating for each said content item a relevance value in dependence upon said comparing in (iv);
   (vi) ordering and storing said plurality of content items based, at least in part, on said relevance values calculated in (v).

2. The method of claim 1, wherein, in (v), said relevance value is calculated by counting the number of matching characteristics in the results of said bitwise AND operation in (iv).

3. The method of claim 1, further comprising:
   (vii) caching said plurality of content items ordered in (vi) utilizing a cache key generated from said user preference bit string.

4. A computer readable storage medium containing computer executable code for organizing a plurality of content items, said computer executable code comprising:
   (a) code for assigning to each content item a content item array, wherein each ordinal of said content item array indicates a characteristic of said content item;
   (b) code for applying a content filter to said plurality of content items, said content filter including at least one filter rule concerning at least one characteristic of each said content item, wherein said array comprises a content item bit string, and said each ordinal comprises a unique bit position in said content item bit string;
   (c) code for assigning to each user of said plurality of content items a user preference bit string, wherein each unique bit position in said user preference bit string indicates whether said user has a preference for a corresponding characteristic of said content items;
   (d) code for comparing said user preference bit string to each said content item bit string to determine if any characteristics match, wherein, in (d), said computer executable code includes code for performing a bitwise AND operation between each said content item bit string and said user preference bit string;

(e) code for calculating for each said content item a relevance value in dependence upon said comparing in (d);

(f) code for ordering said plurality of content items based, at least in part, on said relevance values calculated in (e).

5. The computer readable storage medium of claim 4, wherein, in (e), said code for calculating a relevance value for each said content item comprises code for counting the number of matching characteristics in the results of said bitwise AND operation in (d).

6. The computer readable storage medium of claim 4, wherein said computer executable code further comprises:

(g) code for caching said plurality of content items ordered in (f) utilizing a cache key generated from said user preference bit string.

* * * * *